April 14, 1936.　　　M. M. CLAYTON　　　2,037,368
WIRING DEVICE
Filed Aug. 10, 1933　　　2 Sheets-Sheet 1
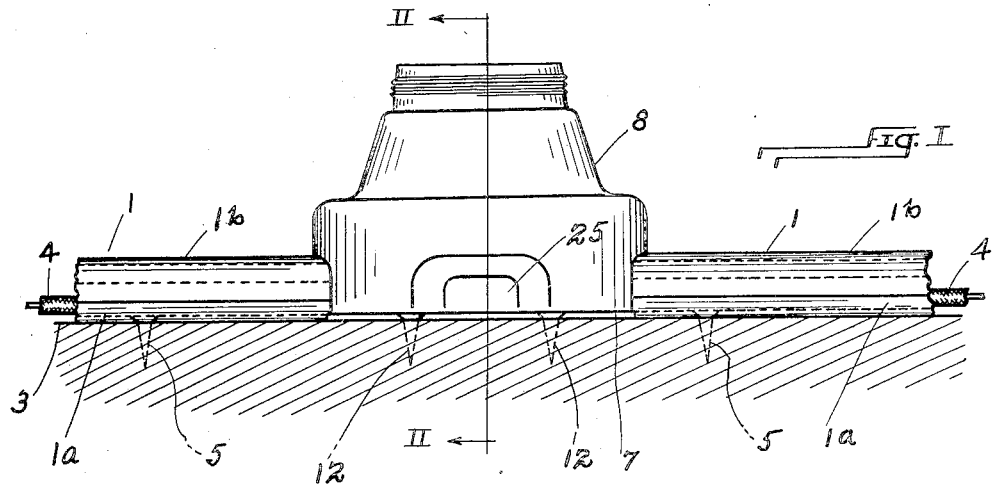
Fig. I
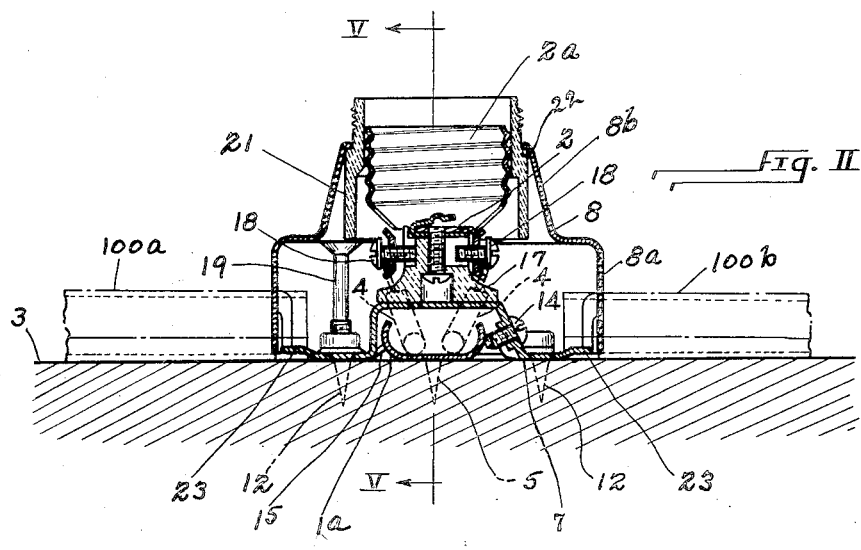
Fig. II
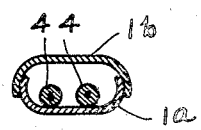
Fig. III
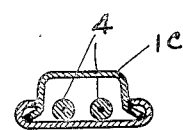
Fig. IV
INVENTOR
Martin M. Clayton
by Christy Christy and Wharton
his attorneys April 14, 1936.   M. M. CLAYTON   2,037,368
WIRING DEVICE
Filed Aug. 10, 1933   2 Sheets-Sheet 2
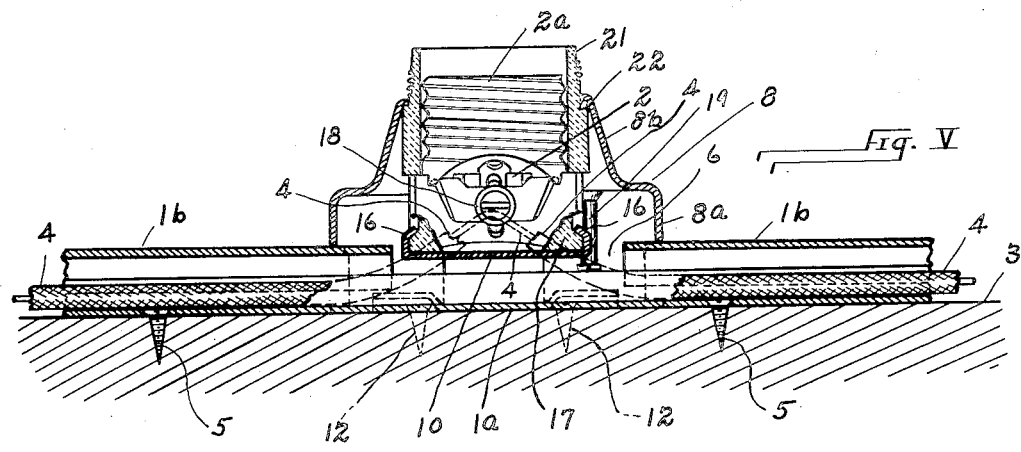
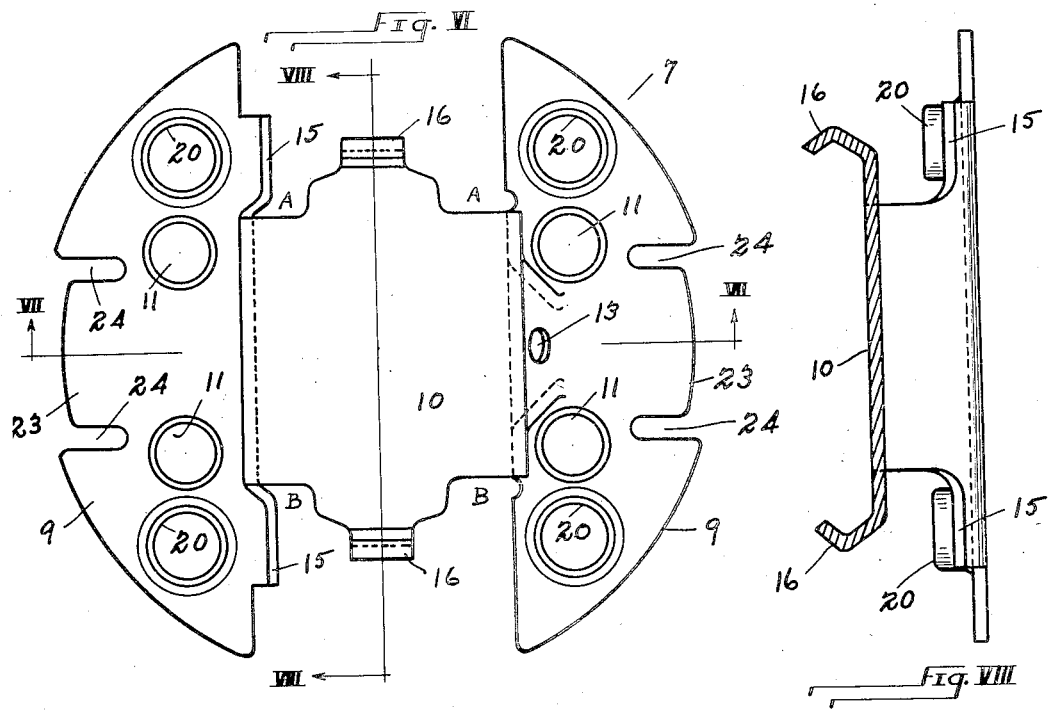
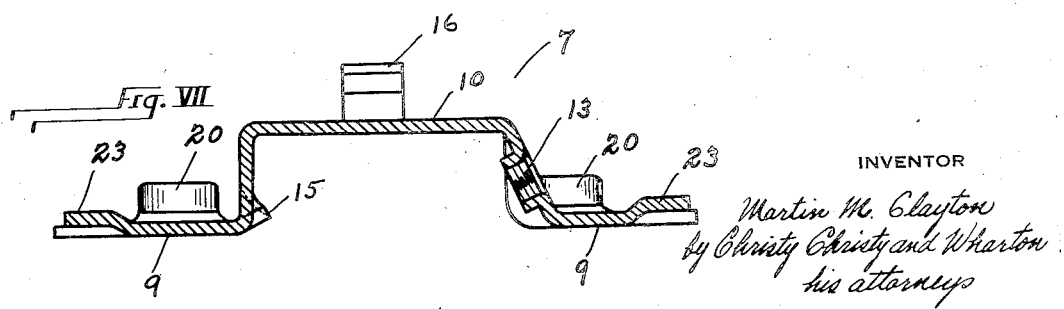
INVENTOR
Martin M. Clayton
by Christy, Christy and Wharton
his attorneys Patented Apr. 14, 1936

2,037,368

UNITED STATES PATENT OFFICE 2,037,368

WIRING DEVICE

Martin M. Clayton, Baden, Pa., assignor to National Electric Products Corporation, a corporation of Delaware Application August 10, 1933, Serial No. 684,536

5 Claims. (Cl. 247—15)

The invention relates to metal conduits or raceways for electric wires, and particularly to conduits of the sort which comprise a channel base and a cover member therefor. In service the base is secured to the surface of a wall, ceiling, floor, or other support; then the electric wires are laid in the base and the cover member is applied, completing the protective housing for the wires. At predetermined points in the extent of such conduit, switches, plug sockets, lamp sockets, and other electric devices (depending upon the particular requirements) are installed and connected to the electric wires housed in the conduit. To afford access to the electric wires within, the continuity of the cover member of the conduit is interrupted at each point where an electric device is to be installed. More specifically, my invention lies in an improved assembly of electric devices with metal conduit of the two-piece sort, and in improvements in the structure of the base or housing, by means of which such electric devices are assembled with the conduit.

In the accompanying drawings I have illustrated in exemplary way, two types of metal conduit which may be used in the practice of my invention, and, I have shown a screw-type socket as the electric device to be installed. Fig. I is a fragmentary view of a length of metal conduit, showing in side elevation the screw socket assembled therewith in accordance with the invention. Fig. II is a view in vertical section, taken on the plane II—II of Fig. I. Fig. III is a view in transverse section of the two-part metal conduit shown in Figs. I and II. Fig. IV is a similar view of two-part metal conduit of modified form. Fig. V is a longitudinal sectional view, on the plane V—V, Fig. II, of the structure shown in Figs. I and II. The invention embraces improvements in the means for assembling electric fixtures with the conduit, and such means comprise a basal member and a cover. Fig. VI is a view in plan (to larger scale) of the basal member; and Figs. VII and VIII are sectional views of such basal member, taken respectively on the planes VII—VII and VIII—VIII of Fig. VI.

In the illustrated embodiment of the invention, the electric device to be installed with the metal conduit 1 is a screw socket 2 (Fig. II). The metal conduit 1 is of well-known two-part type, comprising a basal or channel member 1a, and a top or cover member 1b. In service the basal member 1a is secured to a supporting surface 3 by means of nails or screws 5, and the cover member 1b is sprung into secure position upon the basal member, thus providing a protective raceway for the electric wires 4.

In accordance with my invention the means for securing electric fixtures (in this case the screw socket 2) in place include two members—a floor or basal plate member 7 and a cover or housing member 8. Referring particularly to Figs. VI-VIII, the basal member or mounting element 7 includes two lateral floor or flange portions 9, and between the portions 9 a central body portion 10 is provided. The central body portion 10 is offset from the plane of extent of the lateral portions 9, and in service the lateral flanges 9 lie against the supporting surface 3 on opposite sides of the conduit 1, while the intermediate portion 10 bridges the basal member 1a of the conduit. Orifices 11 are provided in the flange portions 9, whereby securing means, such as screws 12, may be employed to affix the basal plate firmly to the supporting surface 3. Advantageously, the connecting wall between one of the lateral flanges 9 and the bridging portion 10 of the basal member includes a threaded hole 13 (Fig. VII), through which a clamping screw 14 (Fig. II) is projected; the body of the basal member 7 includes two inclined elements 15 which in service are adapted to engage from below the one side wall of the conduit basal member 1a, and the screw 14 projects on such angle that its tip may be run into tight engagement with the opposite side wall of the basal number 1a. Manifestly, the screw 14 and elements 15 serve to clamp the conduit member 1a and the basal plate 7 firmly together, and this admits of an advantage presently to be described.

The bridging portion 10 of the basal member 7 comprises a seat for the electric device to be installed—the socket structure 2 in this case. I provide tongues 16 extending from the opposite ends of the bridging portion 10, and these tongues are pressed into locking engagement with the porcelain base 17 of the socket structure 2, as indicated in Fig. V. Thus, the electric device 2 and basal member 7 comprise a unit which, by means of clamping elements 14, 15 may be readily secured to the channel or basal member 1a of the conduit 1. In Figs. II and V it will be noted that the wiring posts 18 of the socket structure 2 are located on the opposite sides of the base 17, and in the assembly lie at the opposite ends or sides of and above or outward of the bridge portion 10. In this detail my structure is advantageous over those now in use, in that it admits of the ready attachment of the conductor wires 4, during the installation of the equipment. Of course, the wiring posts 18 are electrically isolated from one another in the base 17, and, in accordance with usual practice, constitute the electric terminals or poles of the device 2. The electric wires 4 are bared at such points in their common extent that electric union may be established with the posts 18 of the socket. Due to my particular structure, it is not necessary to cut the wires 4, nor to twist them or the socket structure in awkward positions to effect the union. Indeed, in one method of installation, the basal member 1a of the conduit is first secured to the supporting surface 3; then the base plate 7 and electric device 2—as a unit—are secured over the conduit member 1a; next the wires 4 are laid in the conduit member 1a, and the bared portions of the wires are readily and in an instant looped over the bridge portion 10 and connected to the terminals or posts 18, which in accordance with usual practice comprise copper or brass screws having kerfed heads adapted to be turned into tight engagement with the bared portions of the wires.

It is important to note that the attachment of the two wires 4 to the electric device 2 may be readily effected after the electric device has been secured in place upon the base 1a of the metal conduit, and additionally it is important to note that the continuity of the wires 4 need not be interrupted to effect the attachment. The two wires 4 are looped over the bridging portion 10 of the base plate 7 and the bared portions of the wires are severally secured to the wiring posts 18, as indicated in dotted lines in Figs. II and V. That is, one wire 4 extends upward through the clearance A (Fig. VI) and downward through clearance B to the right of the tongues 16, while the other wire 4 extends in such manner through similar clearances A, B, to the left of the tongues 16, and in the portions of the wires so looped over the bridging part 10 of the base plate, the insulation is removed and electric union with the device 2 quickly established. It may be said that the bridging portion 10 is abbreviated longitudinally of the mounting plate 7 to admit of this simplified wiring of the posts 18.

When the wires 4 have been laid in the continuous basal member 1a of the metal conduit, and electric union has been established with the fixture 2, the cover 1b of the conduit is snapped or sprung into secure position on said basal member 1a. The conduit or raceway 1 is a commercial product, and the manner in which the cover 1b is readily secured to the basal member 1a is clearly understood in the art. As indicated in Fig. V the cover member 1b unlike the basal member 1a is discontinued in its extent, to provide clearance 6 for the base plate 7 and fixture 2. When the cover 1b has been applied and the metal raceway for the wires 4 thus completed, the cover member 8 is placed over the parts and secured to the basal plate, by means of a plurality of screws 19. The lateral flanges 9 of the basal plate are provided with embossments 20, which include threaded orifices (Fig. VI) for the reception of the screws 19. As the drawings indicate, the cover 8 is formed of a single piece of sheet metal, and includes a cylindrical lower portion 8a and tapering upper portion 8b. The cylindrical portion 8a of the cover is cut away or recessed inward of its peripheral edge, to fit snugly over the conduit 1. The terminals of the cover member 1b of the conduit lie within the housing or cover 8; the opening or clearance 6 in the conduit, and the electric device 2, are enclosed by the cover 8, so that the installation is one of complete enclosure. Nowhere is the surface 3 exposed to the wires 4.

It is characteristic of the structure that a minimum number of parts is required. It is further characteristic that both the parts 7, 8, of the structure may be fashioned of sheet metal, the construction being such that sheet metal may be readily brought to shape in automatic stamping machinery.

Advantageously, I organize a tubular lining sleeve 21 (say of porcelain, bakelite, or other suitable insulating material) between the metal shell 2a of the socket structure and the cover member 8; the lining sleeve is provided with a circumferential shoulder 22 (Fig. V), and the cover member 8 is formed to engage such shoulder with neat fit, whereby all parts are held in secure assembly, without the aid of structural features which in the ordinary outlet housings destroy symmetry and pleasing appearance. The lining sleeve, it will be perceived, extends a substantial interval from or above the cover 8, and this extension is externally threaded, providing means for the attachment of a lamp shade or other auxiliary device to the assembly. The recesses in the cylindrical wall portion of the cover—the recesses which afford passage for the conduit 1—may be provided in the cover as it is initially manufactured. Alternatively, in accordance with usual practice, the wall of the cover may be weakened along lines defining the desired shape of the openings, so that in the field the mechanic may readily remove the metal within the lines of weakness. Such weakened wall areas are commonly known in the art as knock-out plugs, or knock-out "openings".

My structure embodies another valuable feature which admits of the convenient attachment of branch conduits or raceways, as indicated by the broken lines 100a and 100b in Fig. II.

The base plate 7 is provided on opposite sides with tongues 23 which are offset from the common plane of the lateral flanges 9 a sufficient interval, and with adequate clearances 24, to receive the terminals of the bottom or channel members of the branch conduits 100a, 100b. The cylindrical portion 8a of the cover member 8 is provided with knock-out plugs 25 (Fig. I), which may at the will of the mechanic be removed, so that the ends of the branch conduits may lie within the cover, as indicated in Fig. II.

It will be understood, therefore, that I have provided a metal conduit assembly which may be readily installed. To further an understanding of the advantages of my invention, let it be supposed that a line of electric lamps is to be installed in a store window. First the basal member 1a of the conduit is secured in the position where the series of lights is to be located. Next, a base plate and socket unit 7, 2 is secured over the basal member 1a of the conduit at each point where a lamp is to be installed. Next, the electric wires 4 are laid in the conduit member 1a, and looped over and electrically united with the terminals of the series of socket devices 2 in the advantageous manner already described. The conduit cover pieces 1b are cut to proper length and snapped in place upon the conduit base member between the successive units 7, 2. And, finally, the sleeves 21 and covers 8 are secured over each socket device 2, and the wires 4 are then connected to a source of electric energy. Upon inserting lamps in the sockets the installation is ready for service. The fact that the member 1a is a continuous piece, as described, insures precise alignment of the lamps.

Another advantage of my structure is found in the ease with which additional sockets or other devices may be embodied from time to time in the installation. It is merely necessary to remove the covers 8 of the sockets between which additional installation is to be made, pry off the conduit cover 1b between such sockets, install the additional fixture, bare the wires 4 and connect them to the socket terminals, cut the removed cover piece 1b to provide two pieces of appropriate lengths, then reassemble the cover pieces on the base 1a, and secure the covers 8 in the manner already described.

In the case of stores, restaurants and other places where installation is to be made, it is often objectionable to have a mechanic working during business hours. Here again my invention is of advantage. The mechanic, instead of doing the fabrication or assembly of the installation on the job, only takes the measurements for installation and returns to his workshop. From the measurements quickly taken in the field, he cuts the continuous conduit basal member 1a to required length—clamps the integrated base plates and sockets (7, 2) to the conduit member 1a in the relative positions where the lamps are to be in the finished installation—runs the electric wires 4 along the conduit member 1a, and connects them to the terminals of the socket devices 2—and cuts the conduit cover members 1b to proper length. Thereupon, he returns to the place of installation, quickly secures the assembly as a unit upon the supporting surface 3. It takes but little time to drive home the attaching screws 5, 12, and secure the conduit cover pieces 1b and socket covers 8 in place. It will be noted that the conduit base 1a, mounting bases or plates 7, fixtures 2, and wires 4 may in this manner constitute a portable unit of assembly. Accordingly, the organization and assembly of the metal conduit installation of my invention may be for the most part effected in the workshop, whereby a minimum of time is required for installation at the ultimate place of service.

In Fig. IV I have illustrated a two-part metal conduit of modified form, and it is to be understood that the cover member 1c of such modified conduit may be cut in predetermined lengths, as the cover 1a of conduit 1 is cut, to admit of the practice of my invention.

I claim as my invention:

1. An electrical installation comprising a metal conduit for electric wires, said conduit comprising a channel or trough portion, a mounting element having two spaced-apart flange portions adapted in service to lie upon a supporting surface on opposite sides of, and intermediate the ends of, said trough portion, and a bridging portion extending above and between said flange portions and exposing a region of said trough portion lying therebetween, an electrical device including electrical terminals carried by said bridging portion, a conduit cover portion interrupted in its extent, the ends of the cover in said interruption terminating adjacent the terminal edges of said bridging portion, whereby said electric terminals are accessible to the wires extending in said conduit, and a cover assembled with said mounting element to encase said electrical device and the exposed region of said trough portion.

2. An electrical installation comprising a metal conduit for electric wires, said conduit comprising a channel or trough portion, a mounting element having two spaced-apart flange portions adapted in service to lie upon a supporting surface on opposite sides of, and intermediate the ends of, said trough portion, and a bridging portion extending above and between said flange portions, said bridging portion exposing at its opposite ends regions of said trough portion lying therebeneath, an electrical device including electric terminals carried by said bridging portion, a conduit cover portion interrupted in its extent, the ends of the cover in said interruption terminating short of the opposite ends of said bridge portion, whereby said electric terminals are accessible to the wires extending in said conduit, and a cover element assembled with said mounting element to encase said electrical device and the exposed regions of said trough portion.

3. An electrical conduit and outlet assembly comprising a normally closed conduit forming a continuous raceway for electric wires, a mounting element having spaced-apart flange portions adapted in service to lie upon a supporting surface on opposite sides of the conduit, and a bridging portion extending above the conduit and between the said spaced-apart flange portions, said bridging portion being laterally abbreviated, an electrical device including wiring terminals carried by said abbreviated bridging portion, said conduit being outwardly open in a region underlying and adjacent the ends of said abbreviated bridging portion, whereby said electric wires in uninterrupted continuity may reach from the conduit and over the bridging portion for attachment to said wiring terminals, and a cover element for assembly with said mounting element to encase said electrical device and the open region of the conduit.

4. A mounting structure for assembling an electrical device with a metal conduit for electric wires, said mounting structure including a seat for said electrical device, two spaced-apart flange portions adapted in service to lie upon a supporting surface and on opposite sides of a conduit, said seat comprising a conduit-bridging portion extending above and between said flange portions, and said flange portions including offset tongues lying outward of the ends of said bridging portion to engage the terminals of branch conduits extending in common plane with said flange portions.

5. A bridging device for use with an electrical conduit comprising two extended flanges forming a base adapted to be interlocked with said conduit and connected by a raised bridge portion of less width than the flange portions, said bridge portion being provided with means for attaching an electrical device.

MARTIN M. CLAYTON.